(12) United States Patent
Stojakovic

(10) Patent No.: US 12,551,942 B2
(45) Date of Patent: Feb. 17, 2026

(54) LASER WELDABLE STERLING ALLOY

(71) Applicant: James Avery Craftsman, Inc., Kerrville, TX (US)

(72) Inventor: Dejan Stojakovic, Boerne, TX (US)

(73) Assignee: James Avery Craftsman, Inc., Kerrville, TX (US)

( * ) Notice: Subject to any disclaimer, the term of this patent is extended or adjusted under 35 U.S.C. 154(b) by 0 days.

(21) Appl. No.: 18/916,330

(22) Filed: Oct. 15, 2024

(65) Prior Publication Data

US 2025/0033110 A1  Jan. 30, 2025

Related U.S. Application Data

(63) Continuation of application No. 17/374,396, filed on Jul. 13, 2021, now Pat. No. 12,214,416.

(51) Int. Cl.
| | |
|---|---|
| *B21L 3/00* | (2006.01) |
| *A44C 11/00* | (2006.01) |
| *B21L 11/00* | (2006.01) |
| *B23K 26/21* | (2014.01) |
| *B23K 101/30* | (2006.01) |
| *B23K 103/08* | (2006.01) |
| *C22C 5/06* | (2006.01) |

(52) U.S. Cl.
CPC ............ *B21L 3/00* (2013.01); *A44C 11/00* (2013.01); *B21L 11/005* (2013.01); *B23K 26/21* (2015.10); *C22C 5/06* (2013.01); *B23K 2101/30* (2018.08); *B23K 2103/08* (2018.08)

(58) Field of Classification Search
CPC ..................................... B21L 3/00; B21L 3/02
See application file for complete search history.

(56) References Cited

U.S. PATENT DOCUMENTS

2007/0095045 A1 * 5/2007 Johns ..................... A44C 27/00
59/80

FOREIGN PATENT DOCUMENTS

| | | | | |
|---|---|---|---|---|
| CN | 108130445 A | * | 6/2018 | ........... A44C 27/003 |
| EP | 0241621 A1 | * | 10/1987 | ............. A44C 27/00 |
| GB | 2438198 A | * | 11/2007 | ............... C22C 1/06 |
| JP | 2009248157 A | * | 10/2009 | |

* cited by examiner

*Primary Examiner* — Jared O Brown
(74) *Attorney, Agent, or Firm* — Dykema Gossett PLLC

(57) ABSTRACT

A sterling silver chain and method of manufacturing a sterling silver chain comprising a plurality of chain links. Each of the chain links can comprise a sterling silver wire, the sterling silver wire comprising a first end and a second end. Each of the first end and the second end of each of the plurality of chain links can be joined together through a weld. Each of the plurality of chain links can comprise at least 92.5% by weight silver and at least 6.5% by weight tin.

7 Claims, 2 Drawing Sheets

LASER WELDABLE STERLING ALLOY

BACKGROUND OF THE INVENTION a. Field of the Invention

The instant disclosure relates generally to a silver chain and a method of manufacturing such a silver chain.

b. Background Art

Manufacturing of jewelry requires joining of components of various shapes and dimensions. For example: joining chain links for bracelets and necklaces, attaching ear posts to earrings, joining two or more components of same or dissimilar metals or alloys to complete the design, repairing broken rings and pendant bails, and restoring worn and damaged jewelry.

Traditionally, a brazing process is employed for joining jewelry. Brazing is the process where two or more metal or alloy components are joined by melting and flowing a filler material into the joint area. The filler material is a different alloy with significantly lower melting point than the components that require joining. A choice of the filler alloy depends on the melting temperature of joining components, and it must be selected carefully to prevent potential melting of joining components. Source of heat for hand brazing is a torch from burning oxygen and acetylene mixture or electrical furnace. Since brazing is done at the temperatures significantly above the room temperature, the brazing components need to be protected from oxidation. To prevent oxidation, fluxes are used during torch brazing and an inert gas or reducing gas mixture are used during furnace brazing.

Of all jewelry products, production of necklaces and bracelets requires the most joining of individual elements, specifically joining the ends of each of the individual chain links linked together into chain to form a necklace or a bracelet. This can be done using a filler-filled chain wire. The filler-filled chain wire is formed into individual chain links, and subsequently connected into a chain on a chain machine. The formed chain can be subsequently run through a furnace and the filler alloy in the core of the wire is melted and the chain link ends can be joined.

A traditional sterling alloy is suitable for the described brazing process regardless of the component thickness used for jewelry or a wire diameter used for chains. However, when using welding to join the ends of a chain or other jewelry a traditional sterling alloy can run into problems as the thickness of the sterling alloy increases.

The foregoing discussion is intended only to illustrate the present field and should not be taken as a disavowal of claim scope.

BRIEF SUMMARY OF THE INVENTION

In various embodiments, a sterling silver chain can comprise a plurality of chain links. Each of the chain links can comprise a sterling silver wire, the sterling silver wire comprising a first end and a second end. Each of the first end and the second end of each of the plurality of chain links can be joined together through a weld. Each of the plurality of chain links can comprise at least 92.5% by weight silver and at least 6.5% by weight tin.

In various embodiments, a method of making silver chain can comprise forming a plurality of lengths of sterling silver wire into successive chain links comprising a first end and a second end, abutting the first end and the second end of the successive chain links, and joining the links by laser welding the abutting ends to form a sterling silver chain. The wire can comprise at least 92.5% by weight silver and at least 6.5% by weight tin.

In various embodiments, a sterling silver chain can comprise a plurality of lengths of sterling silver wire. Each of the lengths of sterling silver wire can be formed into successive links whose ends abut. Each of the plurality of lengths of sterling silver wire can be closed by laser welded joints. The sterling silver wire can comprise at least 92.5% by weight silver and at least 6.5% by weight tin.

The foregoing and other aspects, features, details, utilities, and advantages of the present disclosure will be apparent from reading the following description and claims, and from reviewing the accompanying drawings.

DETAILED DESCRIPTION OF THE DISCLOSURE

Figure 1:
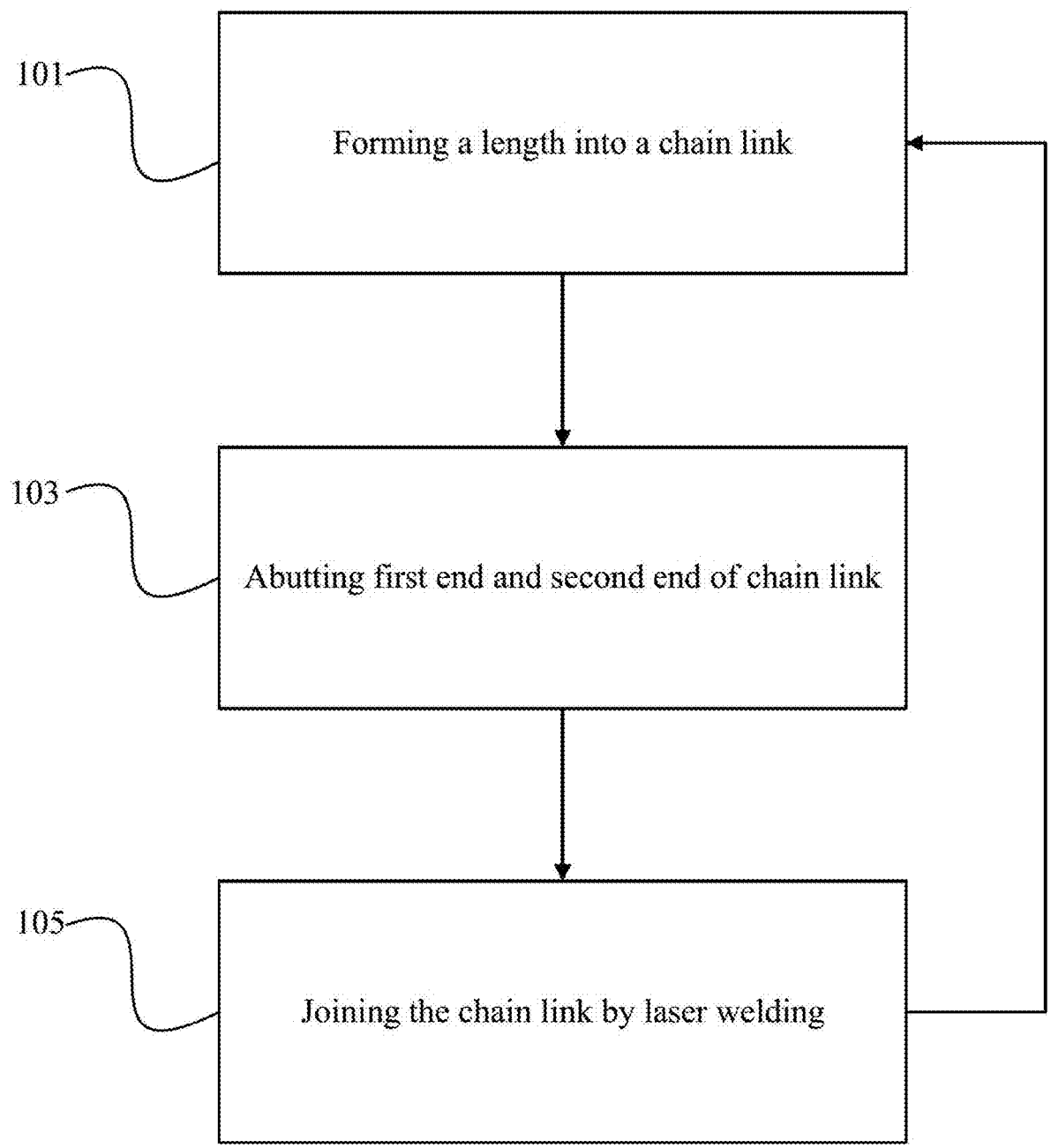
FIG. 1 illustrates a flow chart of a method of manufacturing a sterling silver chain.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

With recent advancements in laser technology, laser welding has been adopted by the jewelry industry for manufacturing, repair, and restoration of jewelry. A traditional sterling silver is a binary alloy composed of a minimum 92.5% by weight of silver and 7.5% by weight of copper. In some embodiments, other metals can be added at the expense of copper. The traditional sterling alloy is highly reflective and highly thermally conductive. These reflective and thermal physical properties of the traditional sterling alloy significantly diminish the efficacy of a laser beam and limit applications of laser welding for sterling silver jewelry. A new sterling alloy with exceptional laser weldability has been successfully developed to overcome short comings of the traditional sterling alloy for laser applications. Specifically, for continuous chain making of sterling silver bracelets and necklaces. The new sterling alloy is also the binary alloy with a complete replacement of copper by tin.

The traditional sterling alloy is suitable for the described brazing process regardless of the component thickness used for jewelry or wire diameter used for chains. However, the traditional sterling alloy can only be laser welded successfully to a size of up to about 0.015 inches in thickness. The welds in the sterling silver wire are considered successful when the welds are fully formed across the cross-section of joined area of each link in the chain. For individual jewelry pieces, this limitation can be overcome by performing a sequence of multiple laser welds to build weld layers across the thickness or around the circumference of that particular individual jewelry piece. For example, during attaching ear posts to earrings and repairing or restoring damaged jewelry. Applying multiple laser welds is not practical or possible for joining of the ends of each individual chain links during a chain making process on chain machines used for manufacturing of bracelets and necklaces as described herein.

When using a machine to manufacture chains, wire that is going to be formed into the chain is cut to length and bent into links, with each link being formed or threaded through the one preceding it so that a chain forms. The link ends of each link are then fastened together to stabilize the chain mechanically. It can be difficult to solder or weld all the links of a silver chain consistently, and objectionable firestain can be observed when attempting to solder or weld sterling silver. The welding of silver chain presents greater difficulties than gold chain because of the high reflectivity and high thermal conductivity of sterling silver.

A new sterling alloy with exceptional laser weldability has been successfully developed for laser welding of jewelry. Specifically, for continuous chain making of sterling silver chains on chain machines used for manufacturing of bracelets and necklaces.

Like the traditional sterling alloy, the new sterling alloy can also be a simple binary alloy and contains at least 92.5% of silver by weight, but the copper is completely replaced by tin as the balance. In one embodiment, the new sterling alloy does not contain any other alloying elements. In other embodiments, variants of the above alloy may be employed that incorporate minor amounts of other alloying ingredients, but the presence of such additional ingredients may not exhibit positive effects. In another embodiment, the new sterling alloy comprises at least 92.5% by weight of silver and at least 6.5% by weight of tin. The balance of the sterling alloy can comprise other metals as would be known to one of ordinary skill in the art. In yet another embodiment, the new sterling alloy comprises at least 92.5% by weight of silver and at least 7% by weight of tin. The balance of the sterling alloy can comprise other metals as would be known to one of ordinary skill in the art. Such alloying ingredients in small amounts that are not detrimental to the corrosion resistance of the alloy, its welding properties, or its physical properties and formability are included within the expression "incidental ingredients." In yet another embodiment, the new sterling alloy comprises at least 92.5% by weight of silver and 7.5% by weight of tin. Additionally, in yet other embodiments, the alloy can comprise at least 92.5% weight by silver and various other concentrations of tin as would be known to one of ordinary skill in the art to allow for acceptable laser weldability of sterling silver chains in a laser welding chain machine.

In one embodiment, the new sterling alloy can be successfully used for the sterling silver chain production with the wire diameter of up to about 0.050 inches. Laser welded wires with up to about 0.050 inches in diameter can have complete and aesthetically pleasing welds. This allows for wires to be welded with about three times larger wire diameter in comparison to the traditional sterling wires. In other embodiments, wires of greater diameter can be laser welded with complete and aesthetically pleasing welds. The wire used to make the sterling silver chain may be of circular cross-section, but other cross-sections may be employed, e.g. oval, polygonal, strip or flat wire depending on the appearance desired for the finished chain. The chains that may be made according to the invention may comprise rope chains, cable-link chains, curb link chains, Figaro chains, Spiga chains, Otto chains, Russian chains and others as would be known to one of ordinary skill in the art.

FIG. 1 illustrates a flow chart of the method of manufacturing a sterling silver chain using the materials and methods discussed herein. Step 101 comprises forming a length of sterling silver wire into a chain link comprising a first end and a second end. Step 103 comprises abutting the first end (224, described below) and the second end (226, described below) of the chain link (220, described below). If a chain link or chain of links is present, the method of manufacturing can comprise placing the chain link of step 101 through a space of a preceding chain link (210, described below) such that the chain link is made part of the chain in step 105. Step 105 comprises joining the link by laser welding (222, described below) the abutting ends (224 and 226, described below) to form a sterling silver chain. The method further comprises repeating the steps to join the chain link with successive chain links (230, 240, described below) to form a chain. In one embodiment, the wire comprises at least 92.5% by weight silver and at least 6.5% by weight tin.

Figure 2:
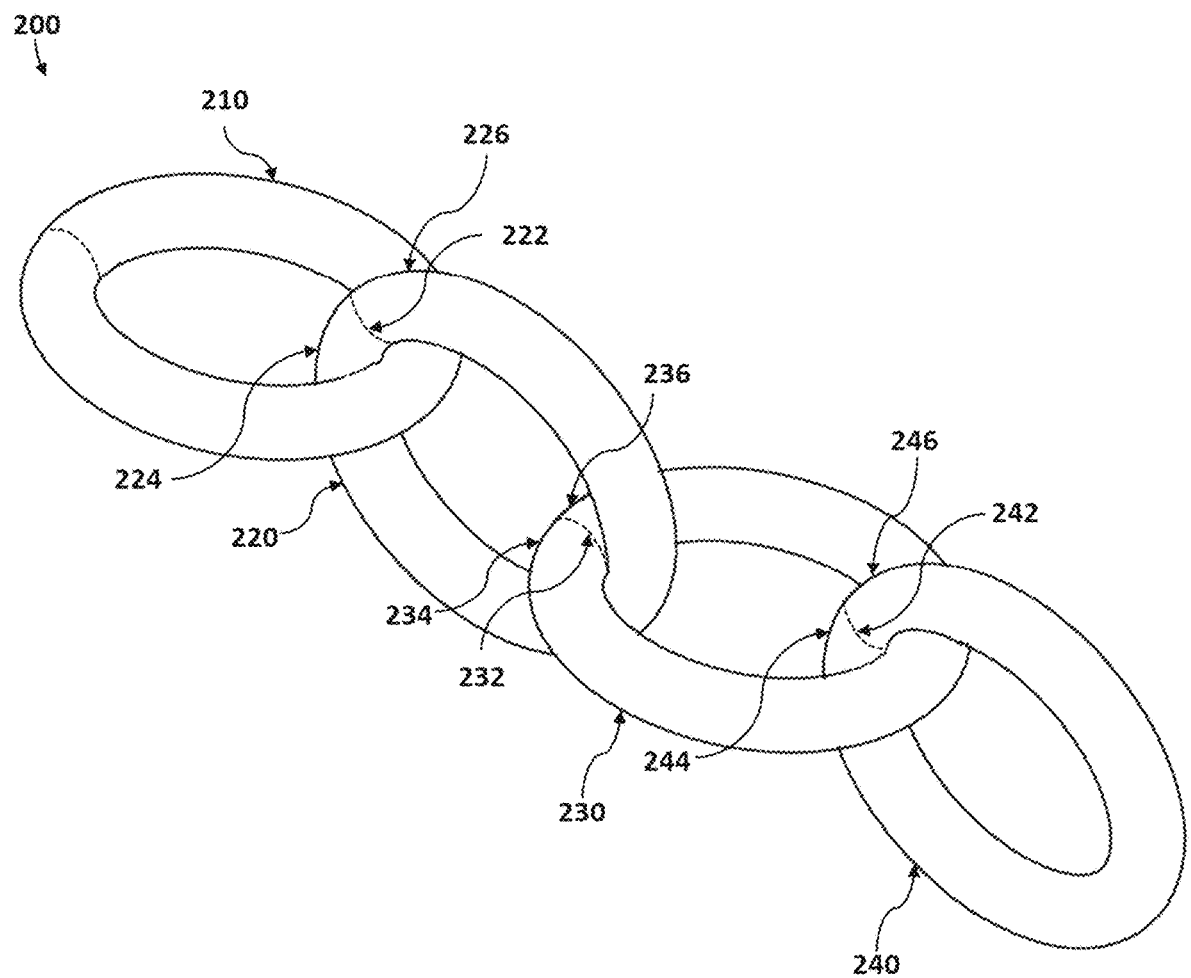
FIG. 2 illustrates a sterling silver chain.

FIG. 2 illustrates a sterling silver chain 200. The sterling silver chain 200 includes links 210, 220, 230, 240 with ends 224, 226, 234, 236, 244, 246 connected at weld points 222, 232, 242, respectively. The links are interconnected as follows: link 220 is connected to link 210 via ends 224 and 226 at weld point 222; link 230 is connected to link 220 via ends 234 and 236 at weld point 232; and link 240 is connected to link 230 via ends 244 and 246 at weld point 242.

Traditionally, sterling silver chains are made with the filler-filled chain wire and brazed in a furnace with protective atmosphere. Before brazing chains need to be powdered to prevent a fusion of the connected chain links while melting the filler material inside the chain link wire and join ends of individual chain links. Temperature and humidity in the room must be controlled for successful application and distribution of the powder on to-be-brazed chains.

Laser welding of sterling silver chain links while formed on chain machines, eliminates the need for the filler-filled chain wire and subsequent brazing process. In contrast, the laser welding of sterling silver chain links can use solid wire of uniform material throughout a cross-section of the sterling silver chain links. Therefore, the laser welding of sterling silver chains is more efficient. It is also environmentally safer and cleaner process because there is no need for use of industrial gases and powders. However, the physical properties of the traditional sterling alloy, specifically high reflectivity and thermal conductivity limit the use of laser welding for sterling silver chains made with the filler-free sterling silver wires with up to about 0.015 inches in diameter.

Modern lasers have a sufficient power to successfully melt and weld most metals and alloys. However, trying to compensate for the high reflectivity and thermal conductivity of the traditional sterling silver alloy, by increasing the laser power or duration of the laser pulse result in poor-quality welds. The poor-quality welds are incomplete and weak, or irregular in shape and not aesthetically acceptable, or the portion of molten material is splattered away resulting in compromised link shape. Compromised welds and link shapes disrupt a proper linking of the formed and subsequently welded chain link to a newly formed chain link on the chain machine, and continuous chain production is interrupted requiring frequent adjustments and restarts of chain production.

As the wire diameter increases to about 0.020 inches, the formation of individual poor-quality welds and links increases too, as well as the frequency in interruption of continuous chain production. Therefore, the welding of the traditional sterling alloy by laser remains difficult and limited to up to about 0.015 inches in diameter.

Sterling silver chains made on chain machines use wire diameters of about 0.010-0.070 inches, more commonly 0.015-0.050 inches. Exceptions are handmade chains, and they can be made with wires of up to about 0.1 inch in diameter or larger.

This invention addresses this problem, and the new binary silver-tin alloy with minimum 92.5% by weight of silver and 7.5% by weight of tin, can be successfully laser welded using wires of up to 0.050 inches in diameter. As stated above, other ranges of tin can also be successfully laser welded as described herein. Specifically, the wires used for continuous chain making on chain machines for sterling silver bracelets and necklaces. A three-fold increase in laser weldable sterling wire diameter significantly expands manufacturing capability for laser welding of many sterling chain styles and designs.

Some chains require a post-processing, like hammering and twisting, or their combination, depending on design. The new sterling alloy is ductile and can be deformed into desired shapes. Depending on the amount of deformation applied, the new sterling silver alloy may need to be heat treated and annealed, like the traditional sterling alloy.

The new sterling alloy is economical to manufacture and it can be produced, and wire fabricated, using existing equipment and procedures established for the traditional sterling alloy manufacturing. Laser welding of chain links by a single laser shot, without compromising the weld strength and aesthetics, is also an extremely efficient chain making process for bracelets and necklaces.

Although at least one embodiment of a silver chain and a method of manufacturing such a silver chain have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

What is claimed is:

1. A method of making a sterling silver chain, comprising:
    forming a plurality of lengths of sterling silver wire into successive chain links comprising a first end and a second end;
    abutting the first end and the second end of the successive chain links, and
    joining the links by laser welding the abutting ends to form the sterling silver chain, wherein the wire comprises a binary alloy comprising at least 92.5% by weight silver, at least 7% by weight tin, and the balance is incidental ingredients, and wherein the joining of the links by laser welding comprises a single laser shot that completely welds the binary alloy with a diameter of up to 0.05 inches in diameter.

2. The method of claim 1, wherein the sterling silver wire is of a diameter greater than 0.015 inches.

3. The method of claim 1, wherein the sterling silver wire is of a diameter less than 0.050 inches.

4. The method of claim 1, wherein the sterling silver wire is solid.

5. The method of claim 1, wherein a cross-section of the sterling silver wire comprises a circular cross-section.

6. The method of claim 1, wherein the diameter ranges from 0.025 to 0.05 inches in diameter.

7. The method of claim 1, wherein the binary alloy comprises at least 92.5% by weight silver, at least 7.4% by weight tin, and incidental ingredients.

* * * * *